(12) United States Patent
Sawada et al.

(10) Patent No.: US 8,307,699 B2
(45) Date of Patent: Nov. 13, 2012

(54) ABNORMALITY DIAGNOSIS APPARATUS AND ABNORMALITY DIAGNOSIS METHOD FOR NOX SENSOR

(75) Inventors: Hiroshi Sawada, Gotenba (JP); Daisuke Shibata, Numazu (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 299 days.

(21) Appl. No.: 12/922,146

(22) PCT Filed: May 21, 2008

(86) PCT No.: PCT/JP2008/059756
§ 371 (c)(1),
(2), (4) Date: Sep. 10, 2010

(87) PCT Pub. No.: WO2009/141918
PCT Pub. Date: Nov. 26, 2009

(65) Prior Publication Data
US 2011/0000290 A1    Jan. 6, 2011

(51) Int. Cl.
*G01M 15/10* (2006.01)
(52) U.S. Cl. .................................. 73/114.75
(58) Field of Classification Search .............. 73/114.69, 73/114.75
See application file for complete search history.

(56) References Cited

U.S. PATENT DOCUMENTS

| | | | |
|---|---|---|---|
| 6,453,663 B1 * | 9/2002 | Orzel et al. | 60/277 |
| 7,921,706 B2 * | 4/2011 | Sumitani | 73/114.69 |
| 7,930,932 B2 * | 4/2011 | Kariya et al. | 73/114.73 |
| 8,219,278 B2 * | 7/2012 | Sawada et al. | 701/30.3 |
| 2004/0040289 A1 | 3/2004 | Mazur et al. | |
| 2004/0200271 A1 | 10/2004 | Van Nieuwstadt | |
| 2006/0086080 A1 | 4/2006 | Katogi et al. | |

FOREIGN PATENT DOCUMENTS

| | | |
|---|---|---|
| JP | 2000-297704 A | 10/2000 |
| JP | 2002-047979 A | 2/2002 |
| JP | 2003-106184 A | 4/2003 |
| JP | 2003-120399 A | 4/2003 |
| JP | 2003-314258 A | 11/2003 |
| JP | 2004-100700 A | 4/2004 |
| JP | 2004-211631 A | 7/2004 |
| JP | 2004-270468 A | 9/2004 |
| JP | 2004-340138 A | 12/2004 |
| JP | 2006-037770 A | 2/2006 |
| JP | 2006-118505 A | 5/2006 |
| JP | 2006-125247 A | 5/2006 |
| JP | 2007-162603 A | 6/2007 |
| JP | 2007-327472 A | 12/2007 |

* cited by examiner

*Primary Examiner* — Freddie Kirkland, III
(74) *Attorney, Agent, or Firm* — Sughrue Mion, PLLC

(57) ABSTRACT

An exhaust passage (15) of an internal-combustion engine (10) includes a selective reduction NOx catalyst (34) and an after-catalyst NOx sensor (50) for detecting a NOx concentration Cr at the downstream thereof. Reducing agent is selectively added from an addition valve (40) to the NOx catalyst. A NOx concentration Ce at the upstream side of the NOx catalyst is detected or estimated. NOx concentrations Cr and Ce before and after the NOx catalyst, which were detected or estimated during the stoppage of an addition of the reducing agent, are compared to each other to thereby determine an abnormality of the after-catalyst NOx sensor (50). An abnormality diagnosis is executed while the addition of reducing agent is being stopped to remove an influence by the NOx catalyst.

20 Claims, 8 Drawing Sheets

ABNORMALITY DIAGNOSIS APPARATUS AND ABNORMALITY DIAGNOSIS METHOD FOR NOX SENSOR

TECHNICAL FIELD

The present invention relates to an apparatus and a method for an abnormality diagnosis of a NOx sensor. In particular, the present invention relates to an apparatus and a method for an abnormality diagnosis for a NOx sensor provided at the downstream of a selective reduction NOx catalyst.

BACKGROUND ART

Generally, as an exhaust purification apparatus provided in an exhaust system of an internal-combustion engine such as a diesel engine, a NOx catalyst has been known that is for purifying the NOx (nitrogen oxide) included in exhaust gas. Regarding this NOx catalyst, various types of NOx catalysts have been known. Among them, a selective reduction NOx catalyst has been known for which an addition of reducing agent is used to continuously reduce and remove NOx. As reducing agent, urea has been known. Typically, urea aqueous solution is injected and supplied to the exhaust gas at upstream-side of the catalyst and heat receipt from exhaust gas or catalyst generates ammonia and NOx is reduced on NOx catalyst by ammonia.

In order to use this selective reduction NOx catalyst, the amount of reducing agent to be added to catalyst must be controlled to an appropriate amount. Thus, a method is used by which a NOx sensor is provided at the downstream side of the catalyst and the amount of the reducing agent is controlled depending on the NOx concentration detected by this NOx sensor.

By the way, in the case of an engine mounted in an automobile for example, in order to prevent the automobile from running with deteriorated exhaust gas, on-board detection of an abnormality of catalyst or a sensor is required by regulations including those in the respective countries. Regarding the detection of an abnormality of catalyst, a relatively large number of techniques already exists. However, as described above, regarding the detection of an abnormality of a NOx sensor provided at the downstream side of NOx catalyst, no effective technique is found in the current situation. In particular, with the current more strict regulations on exhaust gas, it has been required to correctly detect not only a failure such as a disconnection but also the rationality of a sensor output regarding the deterioration for example. Thus, a drastic measure is required that can cope with this.

As this abnormality diagnosis method for a NOx sensor, a method may be considered for example by which a plurality of NOx sensors are provided at an identical position to relatively compare these detection values and a method may be considered by which the NOx sensors are detached and are checked by a fixed analyzer. However, the former case requires a high cost and the latter case fails to provide an on-board diagnosis.

Japanese Laid-Open Publication No. 2003-120399 discloses an abnormality detection apparatus for a NOx sensor that is provided at the downstream side of NOx absorbent. A NOx sensor is determined to be abnormal when the NOx concentration of exhaust gas reaching the NOx sensor is forcedly fluctuated and the fluctuation of the output value of the NOx sensor is different from the fluctuation when the sensor is normal.

However, since the exhaust gas reaching the NOx sensor is exhaust gas having passed NOx absorbent, this exhaust gas has a NOx concentration for which NOx is already absorbed by NOx absorbent. Specifically, the output value from the NOx sensor undesirably reflects an influence by the NOx absorbent in front of the sensor, which causes a deteriorated accuracy of the abnormality diagnosis of the NOx sensor.

Regarding other conventional techniques, Japanese Laid-Open Publication No. 2004-270468 for example discloses an apparatus for causing a NOx storage catalyst to forcedly release NOx during which an actual NOx reduction rate of the NOx storage catalyst is calculated and this actual NOx reduction rate is compared with a reference NOx reduction rate set based on the engine operating condition to thereby determine an abnormality of the NOx sensor. Japanese Laid-Open Publication No. 2004-211631 discloses that, when the deterioration of an exhaust sensor provided at the downstream side of an exhaust purification apparatus is detected, the exhaust purification apparatus is bypassed and exhaust gas is guided to an exhaust sensor. This requires to additionally provide a bypass path for bypassing the exhaust purification apparatus. Japanese Laid-Open Publication No. 2006-118505 discloses that, when a NOx storage catalyst does not provide a NOx storage capacity in an internal-combustion engine in which a NOx sensor is provided at the downstream side of the NOx storage catalyst, a signal of the NOx sensor is compared with a standard to the NOx concentration at the upstream side of the NOx storage catalyst and the NOx sensor signal is corrected. This is a technique regarding a storage-type NOx catalyst and cannot be directly applied to a selective reduction NOx catalyst.

The present invention has been made in view of the above situation. It is an objective of the invention to provide an abnormality diagnosis and an abnormality diagnosis method for a NOx sensor by which an abnormality of a NOx sensor provided at the downstream side of selective reduction NOx catalyst can be favorably detected.

DISCLOSURE OF THE INVENTION

In order to achieve the above objective, according to the first aspect of the present invention, an abnormality diagnosis apparatus for a NOx sensor is provided, characterized in comprising:

a selective reduction NOx catalyst provided in an exhaust passage of an internal-combustion engine;

an after-catalyst NOx sensor for detecting a NOx concentration of exhaust gas at a downstream side of the NOx catalyst;

a reducing agent addition means for selectively adding reducing agent to the NOx catalyst;

before-catalyst NOx concentration acquisition means for detecting or estimating a NOx concentration of exhaust gas at an upstream side of the NOx catalyst; and abnormality determination means for comparing, during the stoppage of an addition of reducing agent by the reducing agent addition means, NOx concentrations detected or estimated by the after-catalyst NOx sensor and the before-catalyst NOx concentration acquisition means respectively to determine an abnormality of the after-catalyst NOx sensor.

The stoppage of the addition of reducing agent prevents NOx catalyst from carrying out the reduction of NOx. Thus, NOx at the upstream of the NOx catalyst passes through the NOx catalyst and directly reaches the downstream of the NOx catalyst. As a result, the NOx concentration at the upstream side of the NOx catalyst is roughly equal to that at the downstream side of the NOx catalyst. Thus, when the NOx concentration detected by an after-catalyst NOx sensor is different from the NOx concentration at the upstream side of the NOx catalyst, the after-catalyst NOx sensor can be determined to be abnormal. Since an abnormality diagnosis is carried out as if no NOx catalyst exists, an influence by NOx catalyst in the abnormality diagnosis can be removed and an abnormality of the after-catalyst NOx sensor can be favorably detected, thus securing a high diagnosis accuracy. When the after-catalyst NOx sensor detects an abnormal value, the after-catalyst NOx sensor can be securely detected as being abnormal, since a case where the NOx catalyst is abnormal is prevented from being confused with a case where the after-catalyst NOx sensor is abnormal.

The second aspect of the present invention is characterized in that, in the first aspect, during an idling operation of the internal-combustion engine, the reducing agent addition means stops an addition of reducing agent and the abnormality determination means performs an abnormality determination of the after-catalyst NOx sensor.

The third aspect of the present invention is characterized in that, in the first or second aspect, the abnormality diagnosis apparatus for a NOx sensor includes:

stoppage request signal generating means for generating a stoppage request signal for stopping the internal-combustion engine; and stoppage delay means for delaying, when the stoppage request signal is generated by the stoppage request signal generating means, the stoppage of the internal-combustion engine by a predetermined delay time, wherein during the delay time, the reducing agent addition means stops an addition of reducing agent and the abnormality determination means performs an abnormality determination of the after-catalyst NOx sensor.

The fourth aspect of the present invention is characterized in that, in the third aspect, the abnormality diagnosis apparatus for a NOx sensor includes: forced idling control means for executing a forced idling control for causing the internal-combustion engine to perform an idling operation during the delay time.

The fifth aspect of the present invention is characterized in that, in any of the first to fourth aspects, the reducing agent addition means stops an addition of reducing agent when the NOx catalyst is not within a predetermined temperature range.

The sixth aspect of the present invention is characterized in that, in any of the first to fifth aspects, the before-catalyst NOx concentration acquisition means consists of at least one of estimation means for estimating, based on an operating condition of the internal-combustion engine, a NOx concentration of exhaust gas discharged from the internal-combustion engine and a before-catalyst NOx sensor for detecting a NOx concentration of exhaust gas at an upstream side of the NOx catalyst.

The seventh aspect of the present invention is characterized in that, in the sixth aspect, the before-catalyst NOx concentration acquisition means consists of both of the estimation means and the before-catalyst NOx sensor, and the abnormality determination means compares the detected NOx concentration value by the after-catalyst NOx sensor, the detected NOx concentration value by the before-catalyst NOx sensor, and the estimated NOx concentration value by the estimation means to thereby distinctly determine abnormalities of the after-catalyst NOx sensor, the before-catalyst NOx sensor, and the internal-combustion engine.

The eighth aspect of the present invention is characterized in that, in the seventh aspect, the estimated NOx concentration value by the estimation means is calculated based on a predetermined map and, when the abnormality determination means determines an abnormality of the internal-combustion engine, data in the map is corrected based on at least one of the detection value of the after-catalyst NOx sensor and the detection value of the before-catalyst NOx sensor.

The ninth aspect of the present invention is characterized in that, in any of the first to eighth aspects, the detection of a NOx concentration by the after-catalyst NOx sensor is carried out when a predetermined time has passed since the stoppage of the addition of reducing agent by the reducing agent addition means.

The tenth aspect of the present invention is characterized in that, in any of the first to ninth aspects, the reducing agent is urea.

The eleventh aspect of the present invention provides an abnormality diagnosis method for a NOx sensor, the method is for diagnosing an abnormality of an after-catalyst NOx sensor in an internal-combustion engine in which an exhaust passage includes a selective reduction NOx catalyst and the after-catalyst NOx sensor is provided at the downstream side thereof and reducing agent is selectively added to the NOx catalyst, characterized in comprising:

a step of stopping the addition of reducing agent;

a step of allowing, during the stoppage of the addition of reducing agent, the after-catalyst NOx sensor to detect an after-catalyst NOx concentration and detecting or estimating a before-catalyst NOx concentration at an upstream side of the NOx catalyst; and a step of making comparison between these after-catalyst NOx concentration and before-catalyst NOx concentration to determine an abnormality of the after-catalyst NOx sensor.

The twelfth aspect of the present invention is characterized in that, in the eleventh aspect, the step of stopping the addition of reducing agent includes a step of stopping the addition of reducing agent during an idling operation of the internal-combustion engine.

The thirteenth aspect of the present invention is characterized in that, in the eleventh or twelfth aspect, the step of stopping the addition of reducing agent includes a step of stopping the addition of reducing agent within a predetermined delay time from the generation of a stoppage request sign for stopping the internal-combustion engine to the stoppage of the internal-combustion engine.

The fourteenth aspect of the present invention is characterized in including, in the thirteenth aspect, a step of forcedly causing the internal-combustion engine to perform an idling operation during the delay time.

The fifteenth aspect of the present invention is characterized in that, in any of the eleventh to fourteenth aspects, the step of stopping the addition of reducing agent includes a step of stopping the addition of reducing agent when the NOx catalyst is not within a predetermined temperature range.

The sixteenth aspect of the present invention is characterized in that, in any of the eleventh to fifteenth aspects, the step of detecting or estimating the before-catalyst NOx concentration consists at least one of a step of estimating a NOx concentration of exhaust gas discharged from the internal-combustion engine based on an operating condition of the internal-combustion engine and a step of using a before-catalyst NOx sensor to detect a NOx concentration of exhaust gas at an upstream side of the NOx catalyst.

The seventeenth aspect of the present invention is characterized in that, in the sixteenth aspect, the step of detecting or estimating the before-catalyst NOx concentration consists both of a step of estimating a NOx concentration of exhaust gas discharged from the internal-combustion engine based on an operating condition of the internal-combustion engine and a step of using a before-catalyst NOx sensor to detect a NOx concentration of exhaust gas at an upstream side of the NOx catalyst, and the step of determining an abnormality of the after-catalyst NOx sensor includes a step of comparing the detected NOx concentration value by the after-catalyst NOx sensor, the detected NOx concentration value by the before-catalyst NOx sensor, and the estimated NOx concentration value by the estimation means to thereby distinctly determine abnormalities of the after-catalyst NOx sensor, the before-catalyst NOx sensor, and the internal-combustion engine.

The eighteenth aspect of the present invention is characterized in that, in the seventeenth aspect, the estimated NOx concentration value is a value calculated from a predetermined map based on an operating condition of the internal-combustion engine, and the eighteenth aspect includes a step of correcting, when an abnormality of the internal-combustion engine is determined, data in the map based on at least one of the detection value of the after-catalyst NOx sensor and the detection value of the before-catalyst NOx sensor.

The nineteenth aspect of the present invention is characterized in that, in any of the eleventh to eighteenth aspects, the detection of an after-catalyst NOx concentration by the after-catalyst NOx sensor is carried out when a predetermined time has passed since the stoppage of the addition of reducing agent.

The twentieth aspect of the present invention is characterized in that, in any of the eleventh to nineteenth aspects, the reducing agent is urea.

According to the present invention, such an effect is provided that an abnormality of a NOx sensor provided at a downstream side of a selective reduction NOx catalyst can be detected favorably.

BEST MODES FOR CARRYING OUT THE INVENTION

The following section will describe the best mode for carrying out the invention with reference to the attached drawings.

Figure 1:
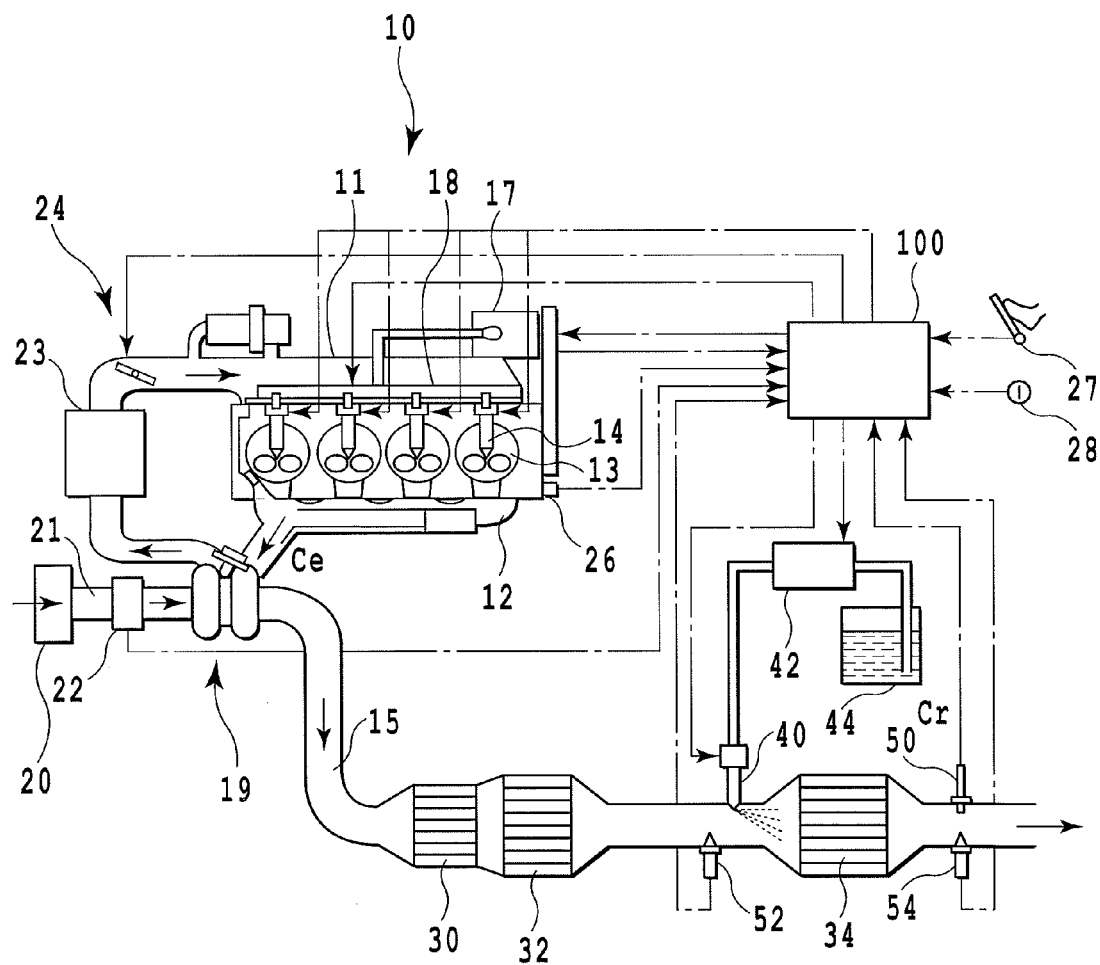
FIG. 1 is a schematic system diagram illustrating an internal-combustion engine according to an embodiment of the present invention.

FIG. 1 is a schematic system diagram illustrating an internal-combustion engine according to an embodiment of the present invention. In the drawing, the reference numeral 10 denotes an automobile compression ignition-type internal-combustion engine (i.e., a diesel engine). The reference numeral 11 denotes an intake manifold communicating with the intake port. The reference numeral 12 denotes an exhaust manifold communicating with the exhaust port. The reference numeral 13 denotes a combustion chamber. In this embodiment, fuel supplied from a fuel tank (not shown) to a high-pressure pump 17 is pressure-fed by the high-pressure pump 17 to a common rail 18 and is accumulated in a high pressure status. Then, the high pressure fuel in the common rail 18 is directly jetted and supplied from an injector 14 into a combustion chamber 13. The exhaust gas from the engine 10 is sent from the exhaust manifold 12 via a turbo charger 19 and is then caused to flow to an exhaust passage 15 at the downstream thereof. Then, the exhaust gas is subjected to a purification processing as described later and is subsequently discharged to atmosphere. It is noted that an embodiment for a diesel engine is not limited to the one including a common rail-type fuel injection apparatus as described above. Other exhaust purification devices such as an EGR apparatus also may be arbitrarily included.

On the other hand, intake air introduced from an air cleaner 20 to the interior of an intake path 21 passes through an air flowmeter 22, the turbo charger 19, an intercooler 23, and a throttle valve 24 sequentially to reach an intake manifold 11. The air flowmeter 22 is a sensor for detecting an intake air amount. Specifically, the air flowmeter 22 outputs a signal depending on the flow rate of the intake air. The throttle valve 24 is the electronic control-type one.

The exhaust passage 15 includes, in an order from the upstream side, an oxidation catalyst 30 for oxidizing unburned components in exhaust gas (HC in particular) for purification; a DPR (Diesel Particulate Reduction) catalyst 32 for trapping the particulate matter (PM) in the exhaust gas to burn and remove the particulate matter; and a NOx catalyst for reducing NOx in the exhaust gas for purification (the selective reduction NOx catalyst 34 in particular) that are provided serially.

In the exhaust passage 15 between the NOx catalyst 34 and the DPR catalyst 32 (i.e., at the downstream side of the DPR catalyst 32 and at the upstream side of the NOx catalyst 34), an addition valve 40 for selectively adding reducing agent of urea to the NOx catalyst 34 is provided. Urea is used in the form of urea aqueous solution and is supplied by being injected from the addition valve 40 to the NOx catalyst 34 at the downstream side into the exhaust passage 15. The addition valve 40 is connected to a supply apparatus 42 for supplying urea aqueous solution thereto. The supply apparatus 42 is connected to a tank 44 for storing urea aqueous solution.

An electronic control unit (hereinafter referred to as ECU) 100 is also provided as a control means for providing the control of the entire engine. The ECU 100 includes CPU, ROM, RAM, an input/output port, and a storage device for example. The ECU 100 controls, based on detection values from various sensors for example, the injector 14, the high-pressure pump 17, and the throttle valve 24 for example so that a desired engine control is carried out. The ECU 100 controls the addition valve 40 and the supply apparatus 42 so as to control the urea addition amount. Sensors for example connected to the ECU 100 include, in addition to the above-described air flowmeter 22, a NOx sensor provided at the downstream side of the NOx catalyst 34 (i.e., an after-catalyst NOx sensor 50) as well as a before-catalyst exhaust temperature sensor 52 and an after-catalyst exhaust temperature sensor 54 provided at the upstream side and the downstream side of the NOx catalyst 34, respectively. The after-catalyst NOx sensor 50 outputs to the ECU 100 a signal depending on a NOx concentration of exhaust gas at the installation position thereof (i.e., a signal depending on the after-catalyst NOx concentration). The before-catalyst exhaust temperature sensor 52 and the after-catalyst exhaust temperature sensor 54 output to the ECU 100 signals depending on the temperatures of exhaust gas at these installation positions. It is noted that the before-catalyst exhaust temperature sensor 52 is provided in the exhaust passage 15 at the downstream side of a DPR catalyst 32 and the upstream side of the NOx catalyst 34.

The ECU 100 is connected to other sensors for example including a crank angle sensor 26, an accelerator opening degree sensor 27, and an engine switch 28. The crank angle sensor 26 outputs, during the rotation of a crank angle, a crank pulse signal to the ECU 100. Based on the crank pulse signal, the ECU 100 detects the crank angle of the engine 10 and calculates the rotation speed of the engine 10. The accelerator opening degree sensor 27 outputs to the ECU 100 a signal depending on the opening degree (accelerator opening degree) of an accelerator pedal operated by a user. The engine switch 28 is turned ON by the user to start the engine and is turned OFF to stop the engine.

A selective reduction NOx catalyst (SCR: Selective Catalytic Reduction) 34 exemplarily includes the one in which a base material surface such as zeolite or alumina supports a noble metal such as Pt, the one in which the base material surface supports a transition metal such as Cu subjected to ion exchange, and the one in which the base material surface thereof supports a titania/vanadium catalyst ($V_2O_5/WO_3/TiO_2$) for example. The selective reduction NOx catalyst 34 reduces and purifies NOx when the catalyst temperature thereof is within an active temperature range and reducing agent of urea is added thereto. When urea is added to the catalyst, ammonia is generated on catalyst and this ammonia reacts with NOx to thereby reduce NOx.

Although the temperature of the NOx catalyst 34 also can be directly detected by a temperature sensor embedded in the catalyst, this temperature is estimated in this embodiment. Specifically, the ECU 100 estimates the catalyst temperature based on the before-catalyst exhaust temperature and the after-catalyst exhaust temperature detected by the before-catalyst exhaust temperature sensor 52 and the after-catalyst exhaust temperature sensor 54, respectively. It is noted that the estimation method is not limited to the example as described above.

The urea addition amount to the NOx catalyst 34 is controlled based on the after-catalyst NOx concentration detected by the after-catalyst NOx sensor 50. Specifically, the urea injection amount from the addition valve 40 is controlled so that the detected after-catalyst NOx concentration value is always zero. In this case, the urea injection amount may be set based on the detected after-catalyst NOx concentration value only or the basic urea injection amount based on the engine operating condition (e.g., the engine rotation speed and the accelerator opening degree) may be subjected to a feedback correction based on the detection value by the after-catalyst NOx sensor 50. Since the NOx catalyst 34 can reduce NOx only when urea is added thereto, urea is always added generally. A control is provided so as to add only the minimum amount of urea required to reduce NOx discharged from the engine. The reason is that an addition of an excessive amount of urea causes ammonia to be undesirably discharged to the downstream of the catalyst (so-called $NH_3$ slip), which causes abnormal odor for example.

When assuming that the minimum urea amount required to reduce the total amount of NOx discharged from the engine A is A and the urea amount actually added is B, the ratio B/A between them is called an equivalent ratio. Although an urea addition control is performed so that the equivalent ratio is close to 1 as much as possible, the actual equivalent ratio is not always 1 because the engine operating condition actually changes momentarily. The equivalent ratio smaller than 1 means an insufficient urea supply amount and thus NOx is discharged to the downstream side of the catalyst. Thus, this is detected by the after-catalyst NOx sensor 50 and the urea supply amount is increased. The equivalent ratio larger than 1 means an excessive urea supply amount, which may cause a case where added urea adheres to the NOx catalyst 34. In this case, even when urea addition is stopped, the urea adhered thereto can reduce NOx for some time.

The execution and stoppage of the urea addition are controlled depending on the catalyst temperature of the NOx catalyst 34 (estimated value in this embodiment). Specifically, urea addition is executed when the catalyst temperature is equal to or higher than a predetermined minimum active temperature (e.g., 200 degrees C.) and urea addition is stopped when the catalyst temperature is lower then the minimum active temperature. The reason is that, when the catalyst temperature does not reach the minimum active temperature yet, NOx cannot be efficiently reduced even with urea addition. Urea addition is also stopped when the catalyst temperature is equal to or higher than a predetermined upper limit temperature (e.g., 600 degrees C.) higher then the minimum active temperature. The reason is that this case also cannot provide an efficient reduction of NOx even with urea addition. However, the frequency at which the catalyst temperature reaches such an upper limit temperature is relatively low because a diesel engine has a lower exhaust temperature than that of a gasoline engine. In conclusion, urea addition is executed when the catalyst temperature is equal to or higher than the minimum active temperature and is lower than the upper limit temperature and urea addition is stopped when the catalyst temperature is not within this temperature range.

During an engine warm-up, the temperature of the NOx catalyst 34 is increased by the heat of exhaust gas from the engine and the temperature of the after-catalyst NOx sensor 50 on the other hand is increased relatively rapidly by the heating by a built-in heater. Thus, the after-catalyst NOx sensor 50 is generally activated sooner than the NOx catalyst 34. The ECU 100 detects the impedance of the after-catalyst NOx sensor and controls the heater so that this impedance is a predetermined value corresponding to the active temperature of the after-catalyst NOx sensor 50.

In this embodiment, the oxidation catalyst 30, the DPR catalyst 32, and the NOx catalyst 34 are arranged in an order from the upstream side. However, the invention is not limited to this order. The DPR catalyst 32 one type of a diesel particulate filter (DPF) that has a filter structure and is the continuous regeneration-type one that has a noble metal in the surface and that continuously oxidizes (or burns) the particulate matters trapped by the filter. The DPF is not limited to the DPR catalyst 32 as described above. Any type of DPF can be used. It is noted that another embodiment is also possible in which at least one of the oxidation catalyst 30 and the DPR catalyst 32 is omitted.

Next, the following section will describe an abnormality diagnosis for the after-catalyst NOx sensor 50.

Generally, an abnormality diagnosis for the after-catalyst NOx sensor 50 in this embodiment is characterized in that urea addition is stopped during an abnormality diagnosis (i.e., the equivalent ratio is set to zero). During this stoppage, the after-catalyst NOx sensor 50 is used to detect the after-catalyst NOx concentration. The before-catalyst NOx concentration at the upstream side of the NOx catalyst is also detected or estimated. Then, comparison is made between these after-catalyst NOx concentration and before-catalyst NOx concentration to determine an abnormality of the after-catalyst NOx sensor 50.

As described above, the stoppage of urea addition prevents the NOx catalyst 34 from functioning, thus preventing NOx from being reduced. As a result, NOx at the upstream side of the NOx catalyst 34 passes through the NOx catalyst 34 and directly reaches at the downstream side of the NOx catalyst. The concentration of NOx at the upstream side of the NOx catalyst 34 (i.e., before-catalyst NOx concentration) is approximately equal to the concentration of NOx at the downstream side of the NOx catalyst 34 (i.e., after-catalyst NOx concentration). Therefore, when the detected after-catalyst NOx concentration value is different from the before-catalyst NOx concentration by a fixed value, the after-catalyst NOx sensor 50 can be determined to be abnormal. When the detected after-catalyst NOx concentration value is not different from the before-catalyst NOx concentration by the fixed value on the contrary, the after-catalyst NOx sensor 50 can be determined to be normal. Since the abnormality diagnosis is carried out in the status where the NOx catalyst does not function (i.e., as if no NOx catalyst exists), an influence by the NOx catalyst on the abnormality diagnosis can be removed, thus securing a high diagnosis accuracy. Even when the after-catalyst NOx sensor detects an abnormal value, a case where the NOx catalyst is abnormal is prevented from being confused with a case where the after-catalyst NOx sensor is abnormal. Thus, the after-catalyst NOx sensor can be detected as being abnormal.

The before-catalyst NOx concentration preferably consists of at least one of a NOx concentration of exhaust gas discharged from the combustion chamber 13 of the engine 10 that is estimated based on the operating condition of the engine 10 (hereinafter referred to as a an estimated before-catalyst NOx concentration) and the NOx concentration detected by a NOx sensor provided at the upstream side of the NOx catalyst 34 (i.e., a before-catalyst NOx sensor) (see the reference numeral 60 of FIG. 6) (hereinafter referred to as a detected before-catalyst NOx concentration).

In this embodiment, the former an estimated before-catalyst NOx concentration is used as a before-catalyst NOx concentration. The ECU 100 calculates an estimated before-catalyst NOx concentration based on a detected value of a parameter showing the engine operating condition (e.g., an engine rotation speed NE and an accelerator opening degree AC) and in accordance with a predetermined map. It is noted that this estimated before-catalyst NOx concentration also can be used for a normal control of a urea addition amount so that data can be commonly used. On the other hand, when the latter a detected before-catalyst NOx concentration is used as a before-catalyst NOx concentration, it requires the use of an actual detection value, thus providing a possibility where an estimate error when the map data becomes inappropriate with time can be excluded. The use of the former and the latter provides the comparison between two values, thus providing a possibility where the diagnosis accuracy may be improved.

Since whether the after-catalyst NOx sensor 50 is normal or abnormal is determined based on the before-catalyst NOx concentration as a reference, the before-catalyst NOx concentration must be an accurate value. Other portions of the engine 10 (e.g., an injector) is also subjected to an abnormality diagnosis by the ECU 100. If no abnormality is detected with regard to other portions, the estimated before-catalyst NOx concentration can be recognized as an accurate value, thus assuring the rationality of the before-catalyst NOx concentration.

It is noted that, when only the detected before-catalyst NOx concentration is used as a before-catalyst NOx concentration, it must be assured that the before-catalyst NOx sensor is normal and provides an accurate detection value. In this embodiment, the upstream of the NOx catalyst 34 has the oxidation catalyst 30 and the DPR catalyst 32. By the existence of them, NOx discharged from the engine 10 is not consumed and may be ignored even when it is consumed. Thus, the estimated before-catalyst NOx concentration may be recognized as being approximately equal to the after-catalyst NOx concentration.

Next, the following section will describe the abnormality diagnosis processing performed by the ECU 100 with regard to the after-catalyst NOx sensor 50.

Figure 2:
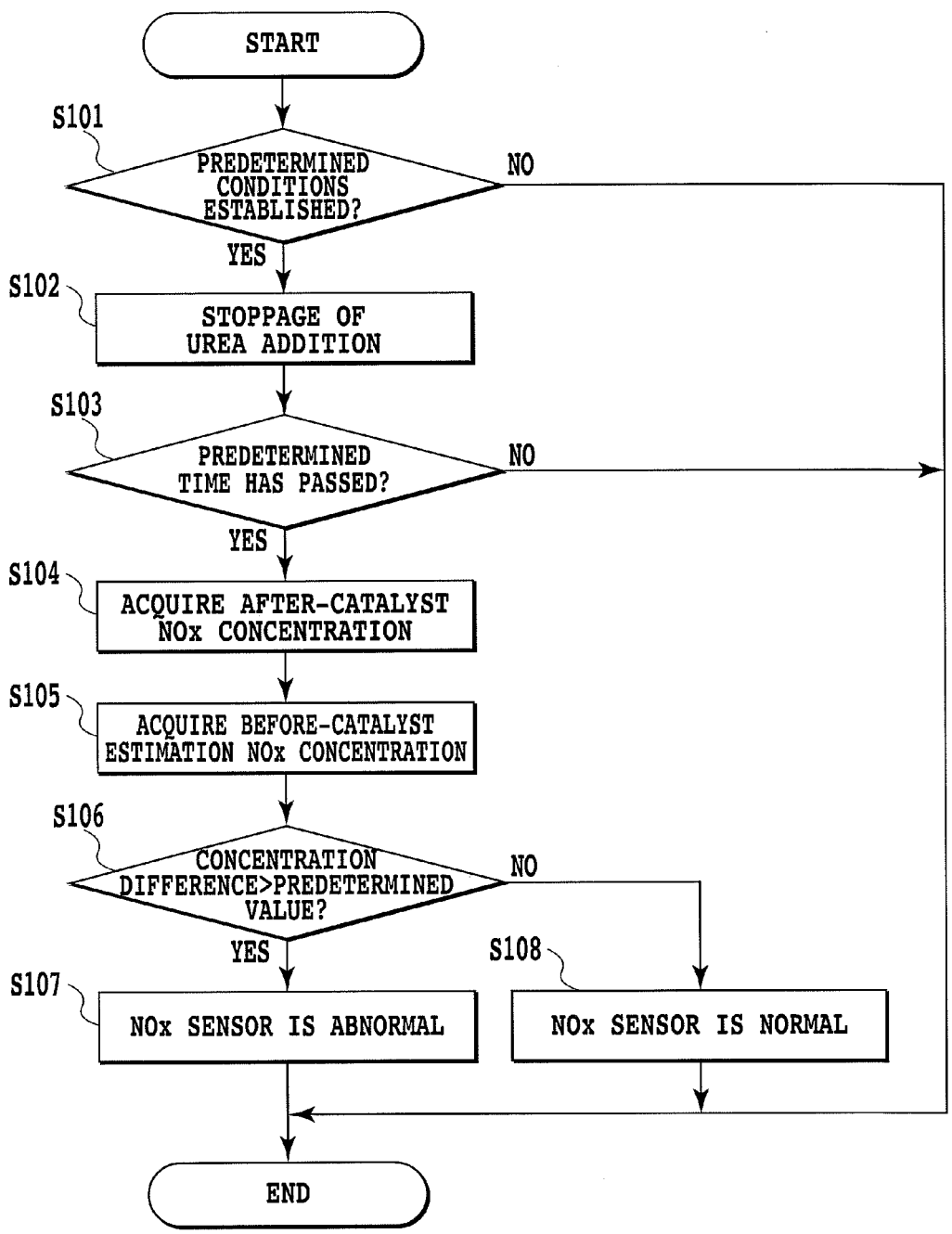
FIG. 2 is a flowchart illustrating the first embodiment of an abnormality diagnosis processing.

FIG. 2 shows the first embodiment of the abnormality diagnosis processing. The shown routine is repeatedly carried out by the ECU 100 with a predetermined cycle (e.g., 16 msec).

In the first step S101, whether predetermined conditions suitable for performing the abnormality diagnosis of the after-catalyst NOx sensor 50 are established or not is determined. For example, when all conditions of (a) the after-catalyst NOx sensor 50 reaches an active temperature, (b) the engine 10 is in a steady operation condition, and (c) the warm-up operation of the engine 10 is completed are satisfied, it means that the conditions are established. It is noted that, regarding the condition (b), the engine 10 can be recognized as being in a steady operation when a variation amount of the intake air amount detected by the air flowmeter 22 for example is within fixed values. Another condition (d) where the NOx catalyst 34 has a catalyst temperature equal to or higher than a predetermined minimum active temperature (e.g., 200 degrees C.) and lower than a predetermined upper limit temperature (e.g., 600 degrees C.) also may be included.

When it is determined that the predetermined conditions are not established, this routine is completed. When it is determined that the predetermined conditions are established on the other hand, the addition valve 40 is controlled in the step S102 to be in a closed status and urea addition is stopped.

In the next step S103, whether a predetermined time has passed since the stoppage of urea addition or not is determined. This predetermined time is a relatively-short time. The reason why the passage of the predetermined time is waited is that, at a timing immediately after the stoppage of urea addition, NOx is reduced by urea adhered to the NOx catalyst 34 and the NOx amount discharged to the downstream of the NOx catalyst 34 may be reduced to be lower than the NOx amount at the upstream thereof. If the passage of the predetermined time is waited, urea remaining on and adhering to the NOx catalyst 34 can be purged by exhaust gas prior to the detection of the after-catalyst NOx concentration. In other words, the predetermined time is set to such a time in advance that can realize the purge as described above.

This predetermined time can be measured by a timer attached to the ECU 100. Alternatively, the passage of the predetermined time also may be set to a timing at which the amount of exhaust gas having passed the NOx catalyst 34 reaches a predetermined value. In this case, since the intake air amount is a correlation value of the exhaust gas amount, the passage of the predetermined time can be set to a timing at which an integration value of the intake air amount detected by the air flowmeter 22 reaches a predetermined value. It also can be considered that, the higher the catalyst temperature is, the sooner the purge is completed. Thus, the passage of the predetermined time also can be set to a timing at which the integration value of the product of the catalyst temperature and the intake air amount reaches a predetermined value.

When it is determined in the step S103 that the predetermined time has not passed, this routine is completed. When it is determined that the predetermined time has passed on the other hand, it is recognized that NOx is not reduced by the NOx catalyst 34. In the step S104, the after-catalyst NOx sensor 50 detects the after-catalyst NOx concentration Cr and the detection value is acquired. Next, in the step S105, the before-catalyst estimation NOx concentration Ce, which is a NOx concentration of exhaust gas discharged from the engine 10, is estimated and the estimated value is acquired.

Thereafter, in the step S106, comparison is made between these after-catalyst NOx concentration Cr and estimated before-catalyst NOx concentration Ce. Specifically, a difference between these after-catalyst NOx concentration Cr and estimated before-catalyst NOx concentration Ce (i.e., a concentration difference $\Delta C$) is calculated by the formula: $\Delta C = |Cr - Ce|$. Then, it is determined whether this concentration difference $\Delta C$ is higher than the predetermined value $\Delta Cs$ or not.

When the concentration difference $\Delta C$ is equal to or lower than the predetermined value $\Delta Cs$, it is recognized that the after-catalyst NOx concentration Cr is substantially equal to the estimated before-catalyst NOx concentration Ce. Then, in the step S108, the after-catalyst NOx sensor 50 is determined to be normal. When the concentration difference $\Delta C$ is larger than the predetermined value $\Delta Cs$ on the other hand, it is recognized that the after-catalyst NOx concentration Cr is relatively different from the estimated before-catalyst NOx concentration Ce. Then, in the step S107, it is determined the after-catalyst NOx sensor 50 is abnormal. Then, this routine is completed.

As described above, during the stoppage of urea addition, the after-catalyst NOx concentration Cr is compared with the estimated before-catalyst NOx concentration Ce to thereby determine the abnormality of the after-catalyst NOx sensor 50. Thus, an abnormality diagnosis can be carried out without being influenced by the intervenient NOx catalyst 34. Thus, a favorable abnormality diagnosis having a high diagnosis accuracy can be realized. Furthermore, since there is no need to add a specific part such as a NOx sensor, the cost is advantageous and there is also no need to add a complicated control. This is also suitable for an on-board diagnosis.

Furthermore, since the after-catalyst NOx concentration Cr and the estimated before-catalyst NOx concentration Ce are acquired after the passage of the predetermined time since the stoppage of urea addition, the acquisition of the concentration value can be realized without being influence by urea adhered to the NOx catalyst 34 and under a secure catalyst-inoperative status.

Figure 3:
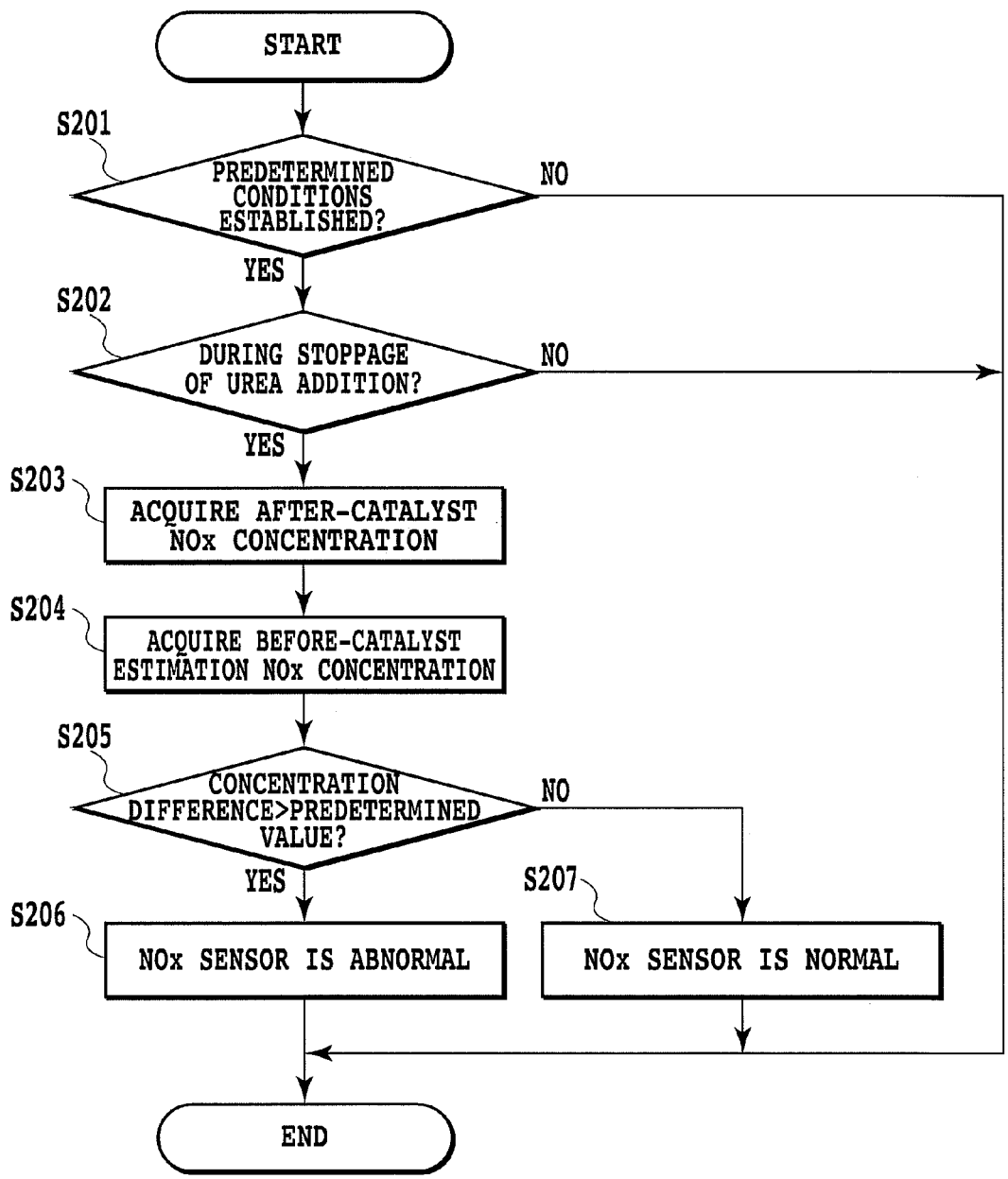
FIG. 3 is a flowchart illustrating the second embodiment of the abnormality diagnosis processing.

Next, the following section will describe the second embodiment of abnormality diagnosis processing with reference to FIG. 3. The routine shown in FIG. 3 is also repeatedly executed by the ECU 100 at every predetermined cycle (e.g., 16 msec).

In the first step S201, it is determined whether predetermined conditions suitable for performing the abnormality diagnosis for the after-catalyst NOx sensor 50 are established or not. The conditions here are different from those in the step S101 in that the two conditions of the condition (a) in which the after-catalyst NOx sensor 50 reaches an active temperature and the condition (b) in which the engine 10 is in an steady operation condition are established for example. When it is determined that the predetermined conditions are not established, this routine is completed.

When the predetermined conditions are established on the other hand, it is determined in the step S202 whether urea addition is being stopped or not. The stoppage operation is a stoppage operation based on a general urea addition control. Specifically, as described above, according to a normal control when the NOx catalyst 34 has a catalyst temperature lower than a predetermined minimum active temperature (e.g., 200 degrees C.), urea addition is stopped. For example, urea addition is stopped when the NOx catalyst 34 is in a warm-up operation and is not yet active or when the NOx catalyst 34 was once activated but the subsequent operating condition or catalyst atmosphere status (e.g., fuel cut, idle, a low external temperature, water or snow adhered to the catalyst) causes the catalyst to be inactive again. Alternatively, urea addition also may be stopped when the engine is being in a warm-up operation. Urea addition is also stopped when the NOx catalyst 34 has a catalyst temperature equal to or higher than a predetermined upper limit temperature (e.g., 600 degrees C.).

In this embodiment, during the stoppage of urea addition in accordance with the normal control as described above, the abnormality diagnosis for the after-catalyst NOx sensor 50 is performed at the same time. This can consequently secure a higher frequency of the abnormality diagnosis.

When it is determined that urea addition is not stopped, this routine is completed.

When it is determined that urea addition is being stopped on the other hand, the after-catalyst NOx concentration Cr is acquired in the step S203 as in the step S104. Next, in the step S204, the estimated before-catalyst NOx concentration Ce is acquired as in the step S105. Thereafter, in the step S205, it is determined whether the concentration difference $\Delta C$ between the after-catalyst NOx concentration C and the before-catalyst estimation NOx concentration Ce is larger than the predetermined value $\Delta Cs$ or not as in the step S106. When the concentration difference $\Delta C$ is equal to or lower than the predetermined value $\Delta Cs$, then it is determined in the step S207 that the after-catalyst NOx sensor 50 is normal. When the concentration difference $\Delta C$ is larger than the predetermined value $\Delta Cs$ on the other hand, it is determined in the step S206 that the after-catalyst NOx sensor 50 is abnormal. Then, this routine is completed.

Figure 4:
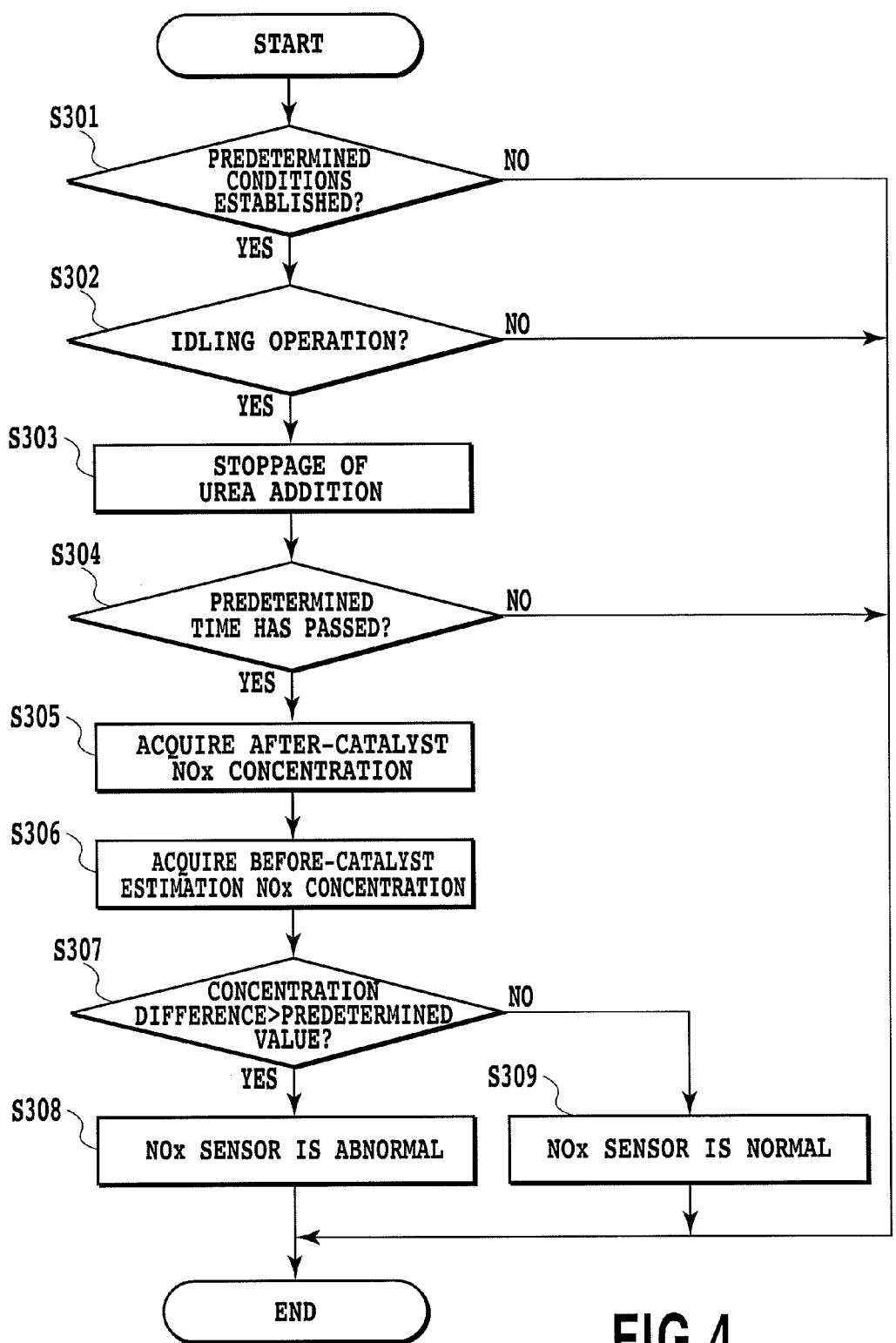
FIG. 4 is a flowchart illustrating the third embodiment of the abnormality diagnosis processing.

Next, the following section will describe the third embodiment of the abnormality diagnosis processing with reference to FIG. 4. The routine shown in FIG. 4 is also repeatedly executed by the ECU 100 at every predetermined cycle (e.g., 16 msec).

In the first step S301, whether predetermined conditions suitable for performing the abnormality diagnosis of the after-catalyst NOx sensor 50 are established or not is determined as in the step S101. When it is determined that the predetermined conditions are not established, this routine is completed.

When it is determined that the predetermined conditions are established on the other hand, it is determined in the step S302 whether the current engine operating condition is an idling operation or not.

Specifically, if urea addition is stopped for abnormality diagnosis, the NOx catalyst 34 cannot reduce NOx and NOx is discharged to the downstream side of the NOx catalyst 34, thus undesirably causing a deteriorated emission. However, during an idling operation, the exhaust gas amount from the engine and the NOx discharge amount are minimum. Thus, by executing the abnormality diagnosis during this, the deterioration of the emission can be minimized. If the abnormality diagnosis is performed during the idling operation, the emission can be improved when compared to a case where the abnormality diagnosis is performed at timings other than the idling operation. Furthermore, since the engine 10 is securely in a steady operation condition during the idling operation, it is advantageous in securing the abnormality diagnosis accuracy.

When it is determined that the engine operating condition is not in the idling operation, this routine is completed. When it is determined that the engine operating condition is in the idling operation on the other hand, the steps S303 to S309 similar to the steps S102 to S108 are executed to determine whether the after-catalyst NOx sensor 50 is normal or abnormal.

Figure 5:
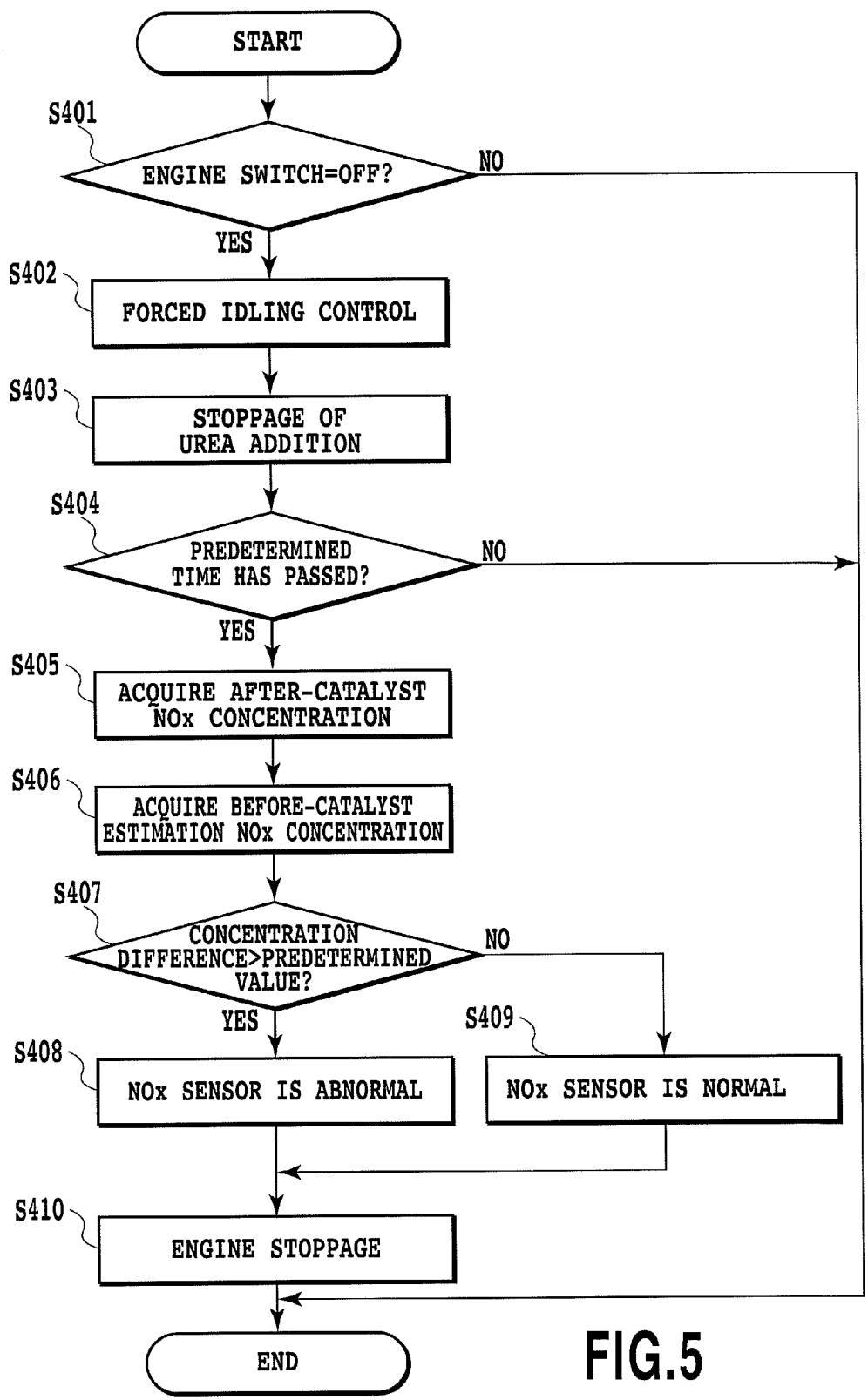
FIG. 5 is a flowchart illustrating the fourth embodiment of the abnormality diagnosis processing.

Next, the following section will describe the fourth embodiment of the abnormality diagnosis processing with reference to FIG. 5. The routine shown in FIG. 5 is executed by the ECU 100 at every predetermined cycle (e.g., 16 msec).

Generally, in this fourth embodiment, the stoppage of the engine 10 is delayed during the stoppage thereof. During this delay time, urea addition is stopped, and the after-catalyst NOx concentration and the estimated before-catalyst NOx concentration are acquired, and an abnormality of the after-catalyst NOx sensor 50 is determined. During the stoppage of the engine 10, in many cases, the NOx catalyst 34 and the after-catalyst NOx sensor 50 are activated and the engine is also in an idling operation. Thus, it is possible to easily satisfy various conditions for an abnormality diagnosis, which is favorable for providing a timing for an abnormality diagnosis. Furthermore, since an abnormality diagnosis is always executed during the engine stoppage, the frequency at which the abnormality diagnosis is executed also can be secured. As in the above-described idling operation, the deterioration of the emission during the abnormality diagnosis also can be minimized.

When the abnormality diagnosis during the engine stoppage delay time is executed, a forced idling control for forcedly subjecting the engine to an idling operation is preferably performed during the delay time. The reason is that, although this is rare, there may be case during the delay time where an accelerator pedal is depressed by a user to prevent an idle status.

The target rotation speed during this forced idling control can be set to be equal to a normal target idle rotation speed that is a value after the engine warm-up. However, the target rotation speed during this forced idling control also can be alternatively set to a predetermined fast idle rotation speed slightly higher than the normal target idle rotation speed. If the target rotation speed during this forced idling control is set to the fast idle rotation speed, the purge rate after the stoppage of urea addition is increased, thus providing a possibility where the abnormality diagnosis is completed at an early stage to shorten the engine stoppage delay time.

As shown in FIG. 5, in the first step S401, it is determined whether the engine switch 28 is turned OFF by the user or not. When the engine switch 28 is turned OFF, an OFF signal is generated and sent to the ECU 100. This OFF signal functions as a stoppage request signal for stopping the engine.

When the engine switch 28 is not turned OFF, this routine is completed. When the engine switch 28 is turned OFF on the other hand, in the step S402, the forced idling control is executed. As a result, the engine is securely maintained in the idle operating condition.

The subsequent steps S403 to S409 are the same as the steps S102 to S108. By the steps S403 to S409, urea addition is stopped. The after-catalyst NOx concentration Cr and the estimated before-catalyst NOx concentration Ce are acquired. The concentration difference ΔC therebetween is compared with the predetermined value ΔCs to determine whether the after-catalyst NOx sensor 50 is normal or abnormal.

Finally, in the step S410, the engine is stopped and this routine is completed. The engine stoppage is delayed only during the delay time from the engine switch OFF of the step S401 to the engine stoppage of the step S410. In order to reduce the feeling of strangeness of the user, the predetermined time of the step S404 is desirably minimized.

Figure 6:
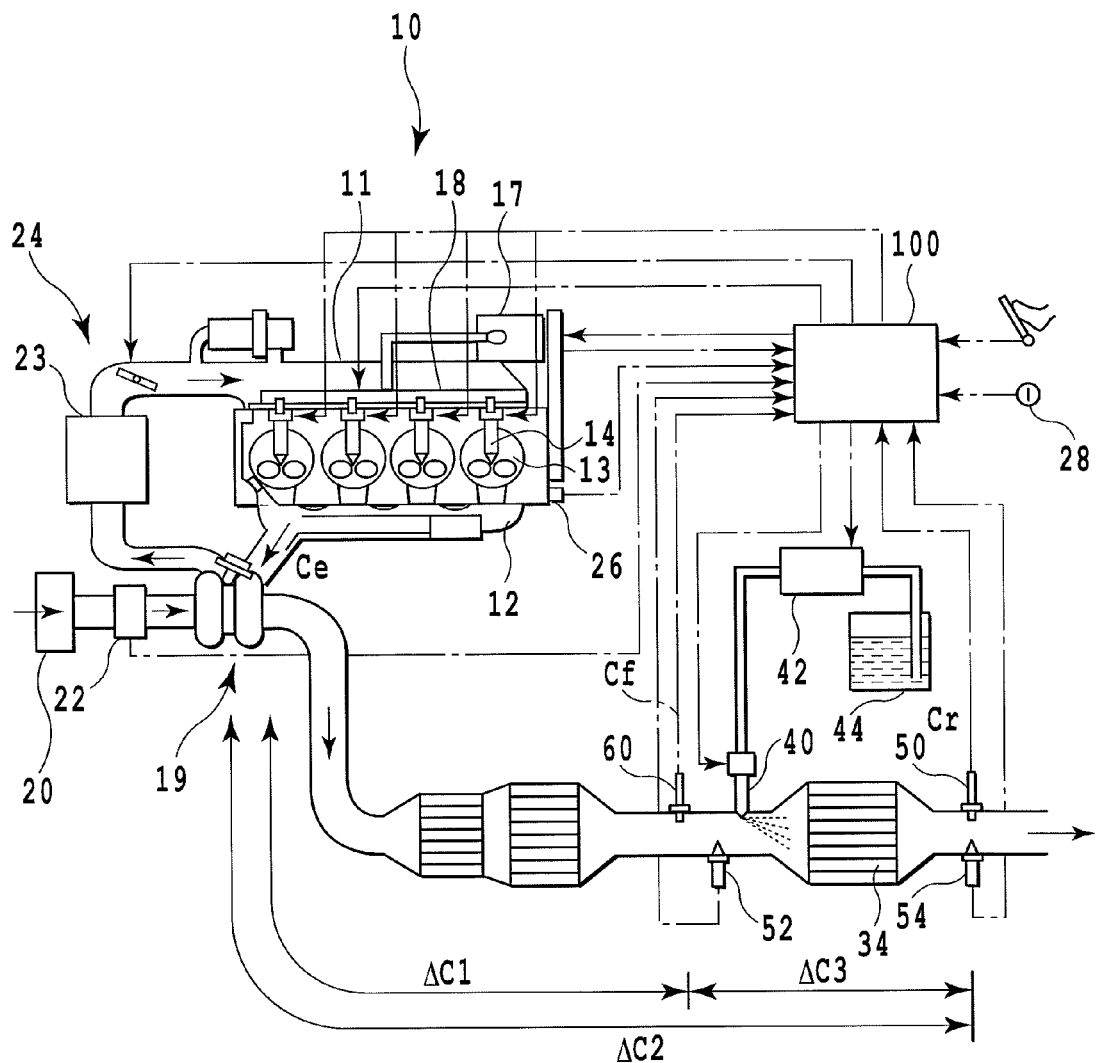
FIG. 6 is a schematic system diagram illustrating an internal-combustion engine according to the fifth embodiment of the abnormality diagnosis processing.

Next, the following section will describe the fifth embodiment of the abnormality diagnosis processing. In this fifth embodiment, as shown in FIG. 6, the upstream side of the NOx catalyst 34 has a NOx sensor (i.e., a before-catalyst NOx sensor 60). The before-catalyst NOx sensor 60 is provided between the NOx catalyst 34 and the DPR catalyst 32 (i.e., in the exhaust passage 15 at the downstream side of the DPR catalyst 32 and at the upstream side of the NOx catalyst 34). The before-catalyst NOx sensor 60 detects a NOx concentration of exhaust gas at the installation position thereof and outputs to the ECU 100 a signal depending on this detected concentration. Hereinafter, the NOx concentration detected by this before-catalyst NOx sensor 60 is called a detected before-catalyst NOx concentration. The before-catalyst NOx sensor 60 is preferably provided at the upstream side of the addition valve 40 as shown but this is not always required.

Generally, in this fifth embodiment, the after-catalyst NOx concentration detected by the after-catalyst NOx sensor 50, the detected before-catalyst NOx concentration detected by the before-catalyst NOx sensor 60, and the estimated before-catalyst NOx concentration estimated based on the engine operating condition are compared (i.e., comparison is made among three points). Then, based on this comparison result, abnormalities of the after-catalyst NOx sensor 50, the before-catalyst NOx sensor 60, and the engine 10 are distinctly determined.

Since the after-catalyst NOx concentration is compared with not only the estimated before-catalyst NOx concentration but also the detected before-catalyst NOx concentration, the reliability of the abnormality diagnosis for the after-catalyst NOx sensor 50 is improved. For example, a comparison between the after-catalyst NOx concentration and the estimated before-catalyst NOx concentration only cannot differentiate, when the after-catalyst NOx concentration is significantly different from the estimated before-catalyst NOx concentration, a case where the after-catalyst NOx sensor 50 is abnormal from a case where the engine is abnormal and thus the discharge NOx amount is abnormal. According to this fifth embodiment, since comparison is made also on the detected before-catalyst NOx concentration, when the estimated before-catalyst NOx concentration is almost equal to the detected before-catalyst NOx concentration and only the after-catalyst NOx concentration is different for example, the after-catalyst NOx sensor 50 can be determined to be abnormal. In the similar manner, abnormalities of the before-catalyst NOx sensor 60 and the engine 10 also can be detected. Only one value different therefrom is determined to be abnormal.

Consequently, not only the abnormality of the after-catalyst NOx sensor 50 but also the abnormalities of the before-catalyst NOx sensor 60 and the engine 10 can be detected. Thus, the width of the abnormality diagnosis can be expanded. Furthermore, since a detection value of the before-catalyst NOx sensor 60 can be used for a normal urea addition control, the urea addition control also can have an improved accuracy.

Figure 7:
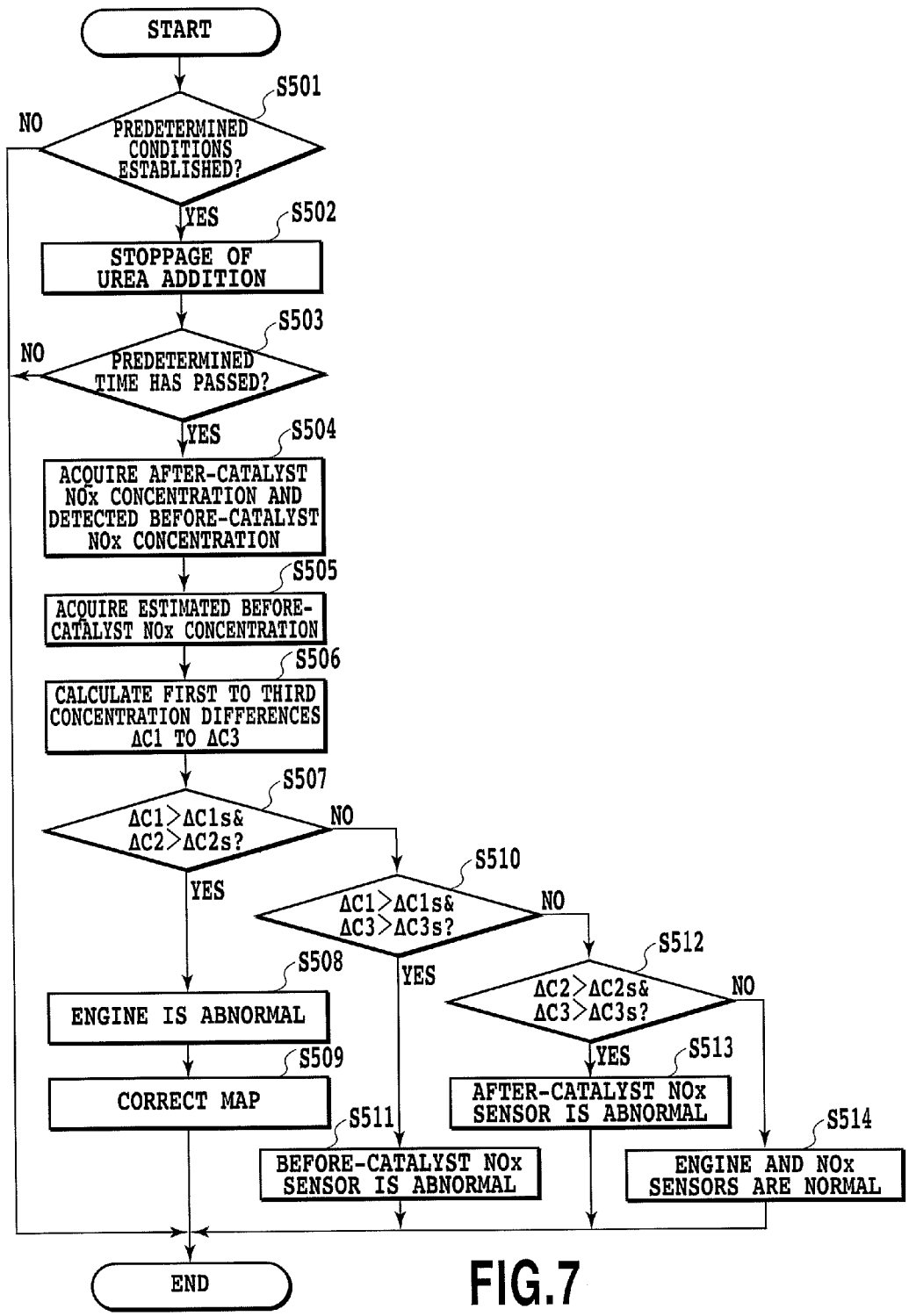
FIG. 7 is a flowchart illustrating the fifth embodiment of the abnormality diagnosis processing.

A specific processing of the fifth embodiment will be described with reference to FIG. 7. The routine shown in FIG. 7 is also repeatedly executed by the ECU 100 at every predetermined cycle (e.g., 16 msec).

The steps S501 to S503 are the same as the steps S101 to S103. When it is determined in the step S503 that the predetermined time has passed, in the step S504, the after-catalyst NOx concentration Cr that is a detection value of the after-catalyst NOx sensor 50 and the detected before-catalyst NOx concentration Cf that is a detection value of the before-catalyst NOx sensor 60 are acquired. Next, in the step S505, the estimated before-catalyst NOx concentration Ce that is an estimated value of the NOx concentration of exhaust gas discharged from the engine 10 is acquired.

Thereafter, in the step S506, the concentration differences among these after-catalyst NOx concentration Cr, detected before-catalyst NOx concentration Cf, and estimated before-catalyst NOx concentration Ce (i.e., the first concentration difference $\Delta C1$, the second concentration difference $\Delta C2$ and the third concentration difference $\Delta C3$) are calculated by the following formula (see FIG. 6).

$$\Delta C1 = |Cf - Ce|$$

$$\Delta C2 = |Cr - Ce|$$

$$\Delta C3 = |Cr - Cf|$$

Next, these first to third concentration differences $\Delta C1$ to $\Delta C3$ are compared with the first to third predetermined value $\Delta C1s$ to $\Delta C3s$, respectively. First, in the step S507, the first concentration difference $\Delta C1$ is compared with the first predetermined value $\Delta C1s$ and the second concentration difference $\Delta C2$ is compared with the second predetermined value $\Delta C2s$.

When the first concentration difference $\Delta C1$ is larger than the first predetermined value $\Delta C1s$ and the second concentration difference $\Delta C2$ is larger tan the second predetermined value $\Delta C2s$ ($\Delta C1 > \Delta C1s \& \Delta C2 > \Delta C2s$), it is recognized that only the estimated before-catalyst NOx concentration Ce is different from the other two values (i.e., the after-catalyst NOx concentration Cr and the detected before-catalyst NOx concentration Cf). Thus, in the step S508, the engine 10 is determined to be abnormal. It is noted that an engine abnormality also can be detected by the normal abnormality diagnosis by the ECU 100 as described above, a double diagnosis is provided by detecting an abnormality of the engine 10 in this step also, thus providing higher reliability.

After the abnormality determination of the engine 10, in the step S509, the map for calculating the estimated before-catalyst NOx concentration Ce is corrected or updated. Specifically, there may be a case where the optimum value of the map data changes from the initial value due to aging for example. Thus, the NOx concentration value actually obtained in the current situation is learnt in the map. Specifically, a value on the map corresponding to the engine parameter (e.g., a rotation speed and an accelerator opening degree) when the estimated before-catalyst NOx concentration Ce is acquired in step S505 is substituted with a value that is based on at least one of the after-catalyst NOx concentration Cr and the detected before-catalyst NOx concentration Cf acquired in the step S504 (e.g., at least one of the values or an average value of both of the values). In this manner, this routine is completed.

When the relations of $\Delta C1 > \Delta C1s$ and $\Delta C2 > \Delta C2s$ are not satisfied in the step S507 on the other hand, the first concentration difference $\Delta C1$ is compared with the first predetermined value $\Delta C1s$ and the third concentration difference $\Delta C3$ is compared with the third predetermined value $\Delta C3s$ in the step S510.

When the first concentration difference $\Delta C1$ is larger than the first predetermined value $\Delta C1s$ and the third concentration difference $\Delta C3$ is larger than the third predetermined value $\Delta C3s$ ($\Delta C1 > \Delta C1s \& \Delta C3 > \Delta C3s$), it is recognized that only the detected before-catalyst NOx concentration Cf is different from the other two values (i.e., the after-catalyst NOx concentration Cr and the estimated before-catalyst NOx concentration Ce). Thus, in the step S511, the before-catalyst NOx sensor 60 is determined to be abnormal. Then, this routine is completed.

When the relations of $\Delta C1 > \Delta C1s$ and $\Delta C3 > \Delta C3s$ are not satisfied in the step S510 on the other hand, the second concentration difference $\Delta C2$ is compared with the second predetermined value $\Delta C2s$ and the third concentration difference $\Delta C3$ is compared with the third predetermined value $\Delta C3s$ in the step S512.

When the second concentration difference $\Delta C2$ is larger than the second predetermined value $\Delta C2s$ and the third concentration difference $\Delta C3$ is larger than the third predetermined value $\Delta C3s$ ($\Delta C2 > \Delta C2s \& \Delta C3 > \Delta C3s$), it is recognized that only the after-catalyst NOx concentration Cr is different from the other two values (i.e., the detected before-catalyst NOx concentration Cf and the estimated before-catalyst NOx concentration Ce). Thus, in the step S513, the after-catalyst NOx sensor 50 is determined to be abnormal. Then, this routine is completed.

When the relations of $\Delta C2 > \Delta C2s$ and $\Delta C3 > \Delta C3s$ are not satisfied in the step S512 on the other hand, it is determined in the step S514 that of the engine 10, the before-catalyst NOx sensor 60, and the after-catalyst NOx sensor 50 are all normal. Then, this routine is completed.

Next, the following section will describe the sixth embodiment of abnormality diagnosis processing. This sixth embodiment is a combination of the fifth embodiment (FIG. 7) and the fourth embodiment (FIG. 5). The abnormality determination for the after-catalyst NOx sensor 50, the before-catalyst NOx sensor 60, and the engine 10 is executed during the engine stoppage delay time.

Figure 8:
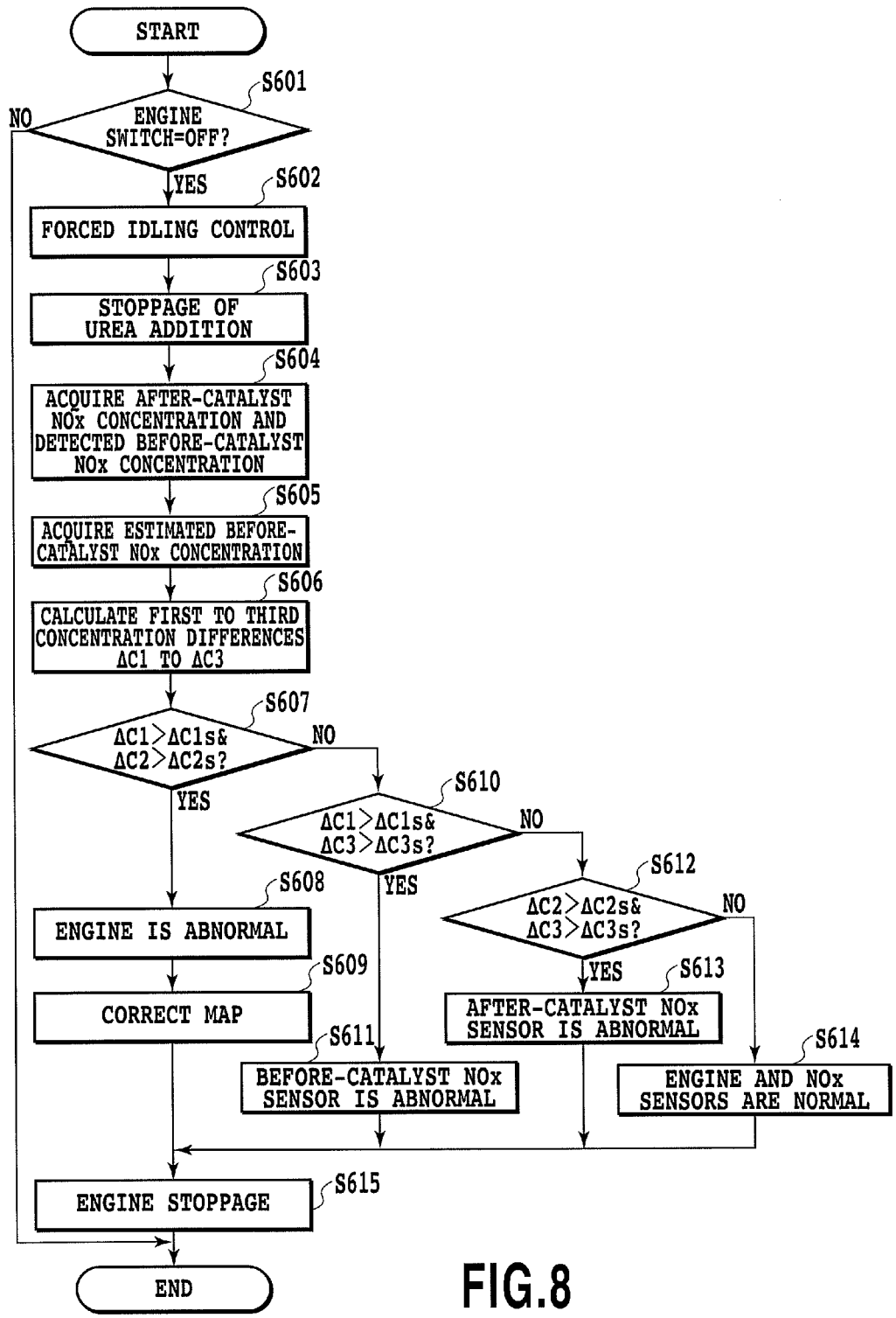
FIG. 8 is a flowchart illustrating the sixth embodiment of the abnormality diagnosis processing.

A specific processing of this sixth embodiment is as shown in FIG. 8. The steps S601 to S603 are the same as the steps S401 to S403 of the fourth embodiment. The subsequent steps S604 to S614 are the same as the steps S504 to S514 of the fifth embodiment. After the steps S609, S611, S613, and S614, the engine 10 is stopped in the step S615 stoppage and this routine is completed.

As described above, the respective first to sixth embodiments can be partially or entirely combined so long as no contradiction is caused.

As will be understood through the above description, in this embodiment, the ECU 100 functions as an abnormality determination means, a stoppage delay means, a forced idling control means, and an estimation means. The addition valve 40 and the supply apparatus 42 functions as a reducing agent addition means. The engine switch 28 functions as a stoppage request signal generating means.

An embodiment of the present invention has been described above. However, the present invention may be carried out in other embodiments. For example, reducing agent may be substances other than urea, including ammonia, hydrocarbon (HC), alcohol, hydrogen, or carbon monoxide for example. In the embodiment, the comparison between the after-catalyst NOx concentration and the before-catalyst NOx concentration was performed based on a difference therebetween. However, the invention is not limited to this comparison method. For example, the comparison also may be performed based on a ratio therebetween. The present invention also can be applied to an internal-combustion engine other than a compression ignition-type internal-combustion engine. For example, the invention also can be applied to a spark-ignited internal-combustion engine (a direct-injection lean burn gasoline engine in particular).

An embodiment of the present invention is not limited to the above-described embodiment and is included in any modification examples, application examples, and equivalents included in the concept of the present invention defined by the claims. Thus, the present invention should not be interpreted in a limited manner and also can be applied to any other techniques within the scope of the concept of the present invention.

INDUSTRIAL APPLICABILITY

The present invention can be applied to a NOx sensor that detects a NOx concentration of exhaust gas at the downstream side of NOx catalyst.

The invention claimed is:

1. An abnormality diagnosis apparatus for a NOx sensor, characterized in comprising:
 a selective reduction NOx catalyst provided in an exhaust passage of an internal-combustion engine;
 an after-catalyst NOx sensor for detecting a NOx concentration of exhaust gas at a downstream side of the NOx catalyst;
 reducing agent addition means for selectively adding reducing agent to the NOx catalyst;
 before-catalyst NOx concentration acquisition means for detecting or estimating a NOx concentration of exhaust gas at an upstream side of the NOx catalyst; and
 abnormality determination means for comparing, during the stoppage of an addition of reducing agent by the reducing agent addition means, NOx concentrations detected or estimated by the after-catalyst NOx sensor and the before-catalyst NOx concentration acquisition means respectively to determine an abnormality of the after-catalyst NOx sensor.

2. The abnormality diagnosis apparatus for a NOx sensor according to claim 1, characterized in that:
 during an idling operation of the internal-combustion engine, the reducing agent addition means stops an addition of reducing agent and the abnormality determination means performs an abnormality determination of the after-catalyst NOx sensor.

3. The abnormality diagnosis apparatus for a NOx sensor according to claim 1, characterized in comprising:
 stoppage request signal generating means for generating a stoppage request signal for stopping the internal-combustion engine; and
 stoppage delay means for delaying, when the stoppage request signal is generated by the stoppage request signal generating means, the stoppage of the internal-combustion engine by a predetermined delay time,
 wherein:
 during the delay time, the reducing agent addition means stops an addition of reducing agent and the abnormality determination means performs an abnormality determination of the after-catalyst NOx sensor.

4. The abnormality diagnosis apparatus for a NOx sensor according to claim 3, characterized in comprising:
 forced idling control means for executing a forced idling control for causing the internal-combustion engine to perform an idling operation during the delay time.

5. The abnormality diagnosis apparatus for a NOx sensor according to claim 1, characterized in that:
 the reducing agent addition means stops an addition of reducing agent when the NOx catalyst is not within a predetermined temperature range.

6. The abnormality diagnosis apparatus for a NOx sensor according to claim 1, characterized in that:
 the before-catalyst NOx concentration acquisition means consists of at least one of estimation means for estimating, based on an operating condition of the internal-combustion engine, a NOx concentration of exhaust gas discharged from the internal-combustion engine and a before-catalyst NOx sensor for detecting a NOx concentration of exhaust gas at an upstream side of the NOx catalyst.

7. The abnormality diagnosis apparatus for a NOx sensor according to claim 6, characterized in that:
 the before-catalyst NOx concentration acquisition means consists of both of the estimation means and the before-catalyst NOx sensor, and
 the abnormality determination means compares the detected NOx concentration value by the after-catalyst NOx sensor, the detected NOx concentration value by the before-catalyst NOx sensor, and the estimated NOx concentration value by the estimation means to thereby distinctly determine abnormalities of the after-catalyst NOx sensor, the before-catalyst NOx sensor, and the internal-combustion engine.

8. The abnormality diagnosis apparatus for a NOx sensor according to claim 7, characterized in that:
 the estimated NOx concentration value by the estimation means is calculated based on a predetermined map and, when the abnormality determination means determines an abnormality of the internal-combustion engine, data in the map is corrected based on at least one of the detection value of the after-catalyst NOx sensor and the detection value of the before-catalyst NOx sensor.

9. The abnormality diagnosis apparatus for a NOx sensor according to claim 1, characterized in that:
 the detection of a NOx concentration by the after-catalyst NOx sensor is carried out when a predetermined time has passed since the stoppage of the addition of reducing agent by the reducing agent addition means.

10. The abnormality diagnosis apparatus for a NOx sensor according to claim 1, characterized in that the reducing agent is urea.

11. An abnormality diagnosis method for a NOx sensor, the method is for diagnosing an abnormality of an after-catalyst NOx sensor in an internal-combustion engine in which an exhaust passage includes a selective reduction NOx catalyst and the after-catalyst NOx sensor is provided at the downstream side thereof and reducing agent is selectively added to the NOx catalyst, characterized in comprising:
 a step of stopping the addition of reducing agent;
 a step of allowing, during the stoppage of the addition of reducing agent, the after-catalyst NOx sensor to detect an after-catalyst NOx concentration and detecting or estimating a before-catalyst NOx concentration at an upstream side of the NOx catalyst; and
 a step of making comparison between these after-catalyst NOx concentration and before-catalyst NOx concentration to determine an abnormality of the after-catalyst NOx sensor.

12. The abnormality diagnosis method for a NOx sensor acceding to claim 11, characterized in that:
 the step of stopping the addition of reducing agent includes a step of stopping the addition of reducing agent during an idling operation of the internal-combustion engine.

13. The abnormality diagnosis method for a NOx sensor according to claim 11, characterized in that:
 the step of stopping the addition of reducing agent includes a step of stopping the addition of reducing agent within a predetermined delay time from the generation of a stoppage request sign for stopping the internal-combustion engine to the stoppage of the internal-combustion engine.

14. The abnormality diagnosis method for a NOx sensor according to claim 13, characterized in comprising:
a step of forcedly causing the internal-combustion engine to perform an idling operation during the delay time.

15. The abnormality diagnosis method for a NOx sensor according to claim 11, characterized in that:
the step of stopping the addition of reducing agent includes a step of stopping the addition of reducing agent when the NOx catalyst is not within a predetermined temperature range.

16. The abnormality diagnosis method for a NOx sensor according to claim 11, characterized in that:
the step of detecting or estimating the before-catalyst NOx concentration consists at least one of a step of estimating a NOx concentration of exhaust gas discharged from the internal-combustion engine based on an operating condition of the internal-combustion engine and a step of using a before-catalyst NOx sensor to detect a NOx concentration of exhaust gas at an upstream side of the NOx catalyst.

17. The abnormality diagnosis method for a NOx sensor according to claim 16, characterized in that:
the step of detecting or estimating the before-catalyst NOx concentration consists both of a step of estimating a NOx concentration of exhaust gas discharged from the internal-combustion engine based on an operating condition of the internal-combustion engine and a step of using a before-catalyst NOx sensor to detect a NOx concentration of exhaust gas at an upstream side of the NOx catalyst, and
the step of determining an abnormality of the after-catalyst NOx sensor includes a step of comparing the detected NOx concentration value by the after-catalyst NOx sensor, the detected NOx concentration value by the before-catalyst NOx sensor, and the estimated NOx concentration value by the estimation means to thereby distinctly determine abnormalities of the after-catalyst NOx sensor, the before-catalyst NOx sensor, and the internal-combustion engine.

18. The abnormality diagnosis method for a NOx sensor according to claim 17, characterized in that:
the estimated NOx concentration value is a value calculated from a predetermined map based on an operating condition of the internal-combustion engine, and
the method includes a step of correcting, when an abnormality of the internal-combustion engine is determined, data in the map based on at least one of the detection value of the after-catalyst NOx sensor and the detection value of the before-catalyst NOx sensor.

19. The abnormality diagnosis method for a NOx sensor according to claim 11, characterized in that:
the detection of an after-catalyst NOx concentration by the after-catalyst NOx sensor is carried out when a predetermined time has passed since the stoppage of the addition of reducing agent.

20. The abnormality diagnosis method for a NOx sensor according to claim 11, characterized in that the reducing agent is urea.

* * * * *